Patented Apr. 1, 1952

2,591,545

UNITED STATES PATENT OFFICE 2,591,545

DI-QUATERNARY SALTS OF PYRIMIDYL-AMINOQUINOLINES

Walter Hepworth, Blackley, Manchester, England, assignor to Imperial Chemical Industries Limited, a corporation of Great Britain No Drawing. Application February 12, 1951, Serial No. 210,631. In Great Britain March 2, 1950

13 Claims. (Cl. 260—256.4)

This invention relates to new quinoline derivatives and more particularly it relates to a process for the manufacture of di-quaternary salts of pyrimidylaminoquinolines useful in the manufacture of substances possessing trypanocidal activity.

According to the invention we provide new di-quaternary salts of pyrimidylaminoquinolines of the formula P$q$NHQ$q$ wherein P stands for a 2-, 4-(or 6-) amino- or lower alkylamino-substituted pyrimidine nucleus in which the lower alkylamino group does not contain more than 5 carbon atoms and which is attached to the linking —NH— group at another of the 2-, 4- (or 6-) positions and which is further substituted by halogen in the remaining 2, 4- (or 6-) position, Q stands for a quinoline nucleus which is substituted in the 4-position by an amino-group or by a lower alkylamino-group containing not more than 5 carbon atoms and which may be further substituted by a lower alkyl group or groups each containing not more than 5 carbon atoms and which bears the linking —NH— group in the 6-position, and the symbols $q$ indicate that the preceding nuclei, P and Q respectively, are present in the form of their quaternary salts.

According to a further feature of the invention we provide a process for the manufacture of the said new compounds which comprises reacting one or more substances of the formula P—NH—Q and PNHQ$q$ wherein P, Q and $q$ have the meaning stated above, with a quaternary salt-forming agent.

As quaternary salt-forming agent we prefer to use methyl p-toluene sulphonate, and in order to obtain the other quarternary salts, for example, the quaternary halides, we find it most convenient to first make the quarternary p-toluene sulphonate and then treat this with a water-soluble salt, for example an inorganic halide.

Thus according to yet a further feature of the invention we provide a process for the manufacture of new compounds of the formula P$q'$—NH—Q$q'$ in which P and Q have the meanings stated above and in which the symbols $q'$ indicate that the preceding nuclei, P and Q respectively, are present in the form of their quaternary salts other than their methyl p-toluene sulphonates, which comprises subjecting a substance of the formula P$q''$—NH—Q$q''$, wherein $q''$ indicates that the preceding nuclei P and Q respectively are present in the form of their methyl p-toluene sulphonates, to the action of a water-soluble salt, for example an inorganic halide.

The new di-quaternary salts of this invention are useful in the manufacture of compounds possessing trypanocidal activity in that the halogen atom in a 2-, 4- (or 6-) position of the pyrimidine nucleus P may be replaced by hydrogen by a process of reduction or it may be replaced by an amino or an alkylamino group by reaction of the di-quaternary salt with ammonia or an alkylamino.

The invention is illustrated but not limited by the following examples in which the parts are by weight.

Example 1

3 parts of 4-amino-6-(6-chloro-2-amino-pyrimidyl-4-amino) quinaldine, 12 parts of methyl-p-toluene sulphonate and 30 parts of dry nitrobenzene are stirred together at 130° C. for 16 hours. The mixture is then cooled, 100 parts of acetone are added and the solid product is filtered off. It is washed with acetone, dried, dissolved in 50% aqueous alcohol and filtered. Excess of sodium iodide is added to the filtrate, the precipitated solid is filtered off and crystallised from water to give 4-amino-6-(6-chloro-2-aminopyrimidyl-4-amino) quinaldine 1:1'-dimethiodide as small yellow needles M. P. 268–270° C. (decomp.).

The starting material may be obtained as follows:

8.2 parts of 4:6-dichloro-2-aminopyrimidine, 3.7 parts of 4:6-diaminoquinaldine, 12.5 parts of 36% aqueous hydrochloric acid and 100 parts of water are boiled together under reflux for 3 hours. The mixture is then filtered hot and the filtrate is made alkaline by the addition of 40% aqueous sodium hydroxide. It is then filtered and then solid is washed with water and dried. It is then dissolved in water and 6.5 parts of 36% aqueous hydrochloric acid are added followed by acetone sufficient to increase the volume fourfold. The solid is filtered off and crystallised from 50% aqueous alcohol to give 4-amino-6-(6-chloro-2-aminopyrimidyl-4-amino) quinaldine hydrochloride as pale yellow needles not melting below 360° C.

The free base may be obtained, by addition of sodium hydroxide to an aqueous solution of the hydrochloride, as colourless needles, M. P. 326° C.

Example 2

2.5 parts of 4-amino-6-(4'-chloro-2'-aminopyrimidyl-6'-amino) quinaldine 1-methochloride, 30 parts of nitrobenzene and 12 parts of methyl p-toluenesulphonate are stirred together and heated at 130° C. for 16 hours. The mixture is then cooled and 100 parts of cold water are added. The mixture is then stirred for 15 minutes and filtered. The solid product is dissolved in 250 parts of a mixture of equal parts of water and ethanol and an excess of sodium iodide is added. The mixture is then filtered and the solid is crystallised from aqueous ethanol to give 4-amino-6-(4'-chloro-2'-amino-pyrimidyl - 6' - amino) quinaldine 1:1'-dimethiodide identical with the substance made as described in Example 1.

The starting material may be obtained as follows:

5.2 parts of 4:6-diaminoquinaldine methochloride hydrochloride, 3.3 parts of 2-amino-4:6-dichloropyrimidine and 65 parts of water are mixed and the mixture is boiled under reflux for 30 minutes. The mixture is then cooled and filtered and the solid is suspended in 300 parts of boiling water. The suspension is made alkaline by the addition of a slight excess of aqueous sodium carbonate. Excess sodium chloride is then added and the mixture is cooled and filtered. The solid product is crystallised from 350 parts of a mixture of equal parts of β-ethoxyethanol and water when 4-amino - 6 - (4'-chloro-2'-aminopyrimidyl-6'-amino)-quinaldine 1-methochloride is obtained as pale yellow needles, which do not melt below 360° C.

*Example 3*

3.8 parts of 4-amino-6-(4'-chloro - 6' - methylaminopyrimidyl-2'-amino)quinaldine, 45 parts of nitrobenzene and 18 parts of methyl toluene-p-sulphonate are mixed and the mixture is stirred and heated at 140° C. for 16 hours. It is then cooled and 100 parts of acetone are added and it is then filtered. The solid product is crystallised from water to give pale yellow needles of 4-amino-6-(4' - chloro-6'-methylaminopyrimidyl-2'-amino)quinaldine 1:3' - di - methotoluene-p-sulphonate, M. P. 276–277° C. (decomp).

The starting material used in this example may be prepared as follows:

5.3 parts of 4:6-diaminoquinaldine, 5.9 parts of 2:4-dichloro - 6 - methylaminopyrimidine, 50 parts of 7% aqueous hydrochloric acid and 200 parts of water are mixed and the mixture is boiled under reflux for 24 hours. The mixture is then poured into excess aqueous sodium hydroxide solution, cooled and filtered. The solid so obtained is dissolved in 400 parts of absolute alcohol and to the solution are added 1000 parts of hot water. 4-amino-6-(4'-chloro-6'-methylaminopyrimidyl-2'-amino)quinaldine crystallises from the mixture as pale as pale cream needles. It is filtered off and dried and has M. P. 260° C. (decomp.).

*Example 4*

1.5 parts of 4 - amino-6-(6'-chloro-2'-aminopyrimidyl-4'-amino)quinoline, 15 parts of dry nitrobenzene and 6 parts of pure methyl-p-toluene sulphonate are stirred together for 23 hours. The mixture is cooled and 150 parts of acetone are added. It is then filtered and the solid is washed with acetone. It is then dissolved in 50 parts of hot water and the solution is made alkaline by adding a slight excess of sodium carbonate solution. The solution is filtered and an excess of sodium chloride solution is added to the filtrate. 4-amino - 6 - (6'-chloro-2'-aminopyrimidyl-4'-amino)quinoline 1:1' - dimethochloride crystallises out and may be recrystallised from 50% aqueous ethanol, when it is obtained as yellow needles which do not melt below 360° C.

The starting material may be obtained as follows:

4 parts of 4:6-diaminoquinoline, 4:1 parts of 2-amino - 4:6 - dichloropyrimidine and 50 parts of 4% hydrochloric acid are heated together under reflux for 2 hours. The mixture is then made soda solution, and filtered and the residual solid is washed with water, and crystallises from aqueous ethanol, when 4-amino-6-(6'-chloro-2'-aminopyrimidyl-4'-amino) quinoline hemihydrate is obtained as colourless needles, M. P. 306° C. (decomp.).

*Example 5*

1 part of 4-methylamino - 6 - (6'chloro-2'-methylaminopyrimidyl - 4' - amino)quinaldine 1-methochloride, 10 parts of dry nitrobenzene and 2 parts of methyl p-toluene sulphonate are stirred together at 145–150° C. for 23 hours. The mixture is then cooled, stirred with an excess of acetone and filtered. The solid product is washed with acetone and dissolved in 250 parts of hot 50% aqueous ethanol. The solution is made slightly alkaline by addition of dilute aqueous sodium carbonate solution, treated with charcoal and filtered. From the filtrate 4 - methylamino-6-(6' - chloro - 2' - methylaminopyrimidyl-4'-amino)quinaldine 1:1'-bis - metho - p - toluenesulphonate crystallises out. It may be recrystallised from water containing a little ethanol, giving yellow prisms, M. P. 340° C. (decomp.).

The starting material may be obtained as follows:

2.7 parts of 6-amino-4-methylaminoquinaldine 1-methochloride dihydrate and 1.8 parts of 4:6-dichloro-2-methylaminopyrimidine are ground together. The mixture is heated under reflux with 32 parts of 1.15% hydrochloric acid for 2¼ hours, cooled and filtered. The solid residue is heated with 60 parts of water. Dilute sodium carbonate solution is added to the mixture until it is alkaline to Brilliant Yellow. There is then added an excess of a hot saturated aqueous sodium chloride solution. The mixture is then filtered hot and the solid residue washed with hot water. It is then boiled with 3000 parts of water and the mixture is filtered hot. To the filtrate there is added an excess of sodium chloride solution and it is then filtered and the solid is crystallised from β-ethoxyethanol and water in equal parts. There is thus obtained 4-methylamino - 6 - (6'-chloro - 2' - methylaminopyrimidyl-4'-amino) quinaldine 1-methochloride as yellow needles which decompose at 325° C.

What I claim is:

1. As new compounds, the di-quaternary salts of pyrimidylaminoquinolines of the formula:

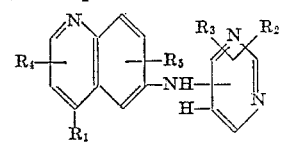

wherein $R_1$ and $R_2$ represent radicals selected from the group consisting of amino and lower alkylamino containing from one to five carbon atoms, $R_3$ represents a halogen radical and $R_4$ and $R_5$ represent radicals selected from the group consisting of hydrogen and lower alkyl of from one to five carbon atoms.

2. A process for the manufacture of the di-quaternary salts of pyrimidylaminoquinolines of the formula:

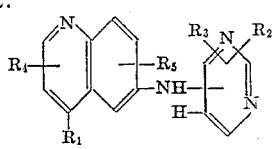

wherein $R_1$ and $R_2$ represent radicals selected from the group consisting of amino and lower atoms, $R_3$ represents a halogen radical and $R_4$ and $R_5$ represent radicals selected from the group consisting of hydrogen and lower alkyl of from one to five carbon atoms, which comprises reacting a member of the group consisting of pyrimidylaminoquinolines as specified in the above formula and the mono-quaternary salts thereof, with a quaternary salt-forming agent.

3. Process as claimed in claim 2 wherein the quaternary salt-forming agent is methyl p-toluene sulphonate.

4. A process for the manufacture of di-quaternary salts of pyrimidylaminoquinolines which comprises reacting di-quaternary methyl-p-toluene sulfonates of pyrimidylaminoquinolines of the formula:

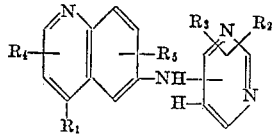

wherein $R_1$ and $R_2$ represent radicals selected from the group consisting of amino and lower alkylamino containing from one to five carbon atoms, $R_3$ represents a halogen radical and $R_4$ and $R_5$ represent radicals selected from the group consisting of hydrogen and lower alkyl of from one to five carbon atoms, with a water-soluble salt.

5. The process of claim 4, wherein said water-soluble salt is an inorganic halide.

6. As new compounds, the di-quaternary salts of pyrimidylamino-quinolines of the formula:

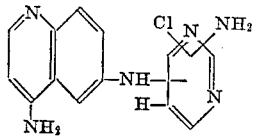

7. As new compounds, the di-quaternary salts of pyrimidylamino-quinolines of the formula:

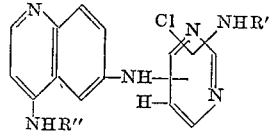

wherein R' and R'' represent lower alkyl radicals containing from one to five carbon atoms.

8. As new compounds, the di-quaternary salts of pyrimidylamino-quinolines of the formula:

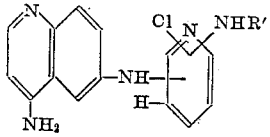

wherein R' represents a lower alkyl radical containing from one to five carbon atoms.

9. As a new compound, 4-amino-6-(6-chloro-2-aminopyrimidyl-4-amino) quinaldine 1:1'-dimethiodide.

10. As a new compound, 4-amino-6-(4'-chloro-2'-aminopyrimidyl-6'-amino) quinaldine 1:1'-dimethiodide.

11. As a new compound, 4-amino-6-(4'-chloro-6'-methylaminopyrimidyl-2'-amino) quinaldine 1:3'-dimethotoluene-p-sulfonate.

12. As a new compound, 4-amino-6-(6'-chloro-2'-aminopyrimidyl-4'-amino) quinoline 1:1'-dimethochloride.

13. As a new compound, 4-methylamino-6-(6'-chloro-2'-methylaminopyrimidyl-4'-amino) quinaldine 1:1'-bismetho-p-toluene-sulfonate.

WALTER HEPWORTH.

No references cited.